US008457114B2

(12) United States Patent
Sahin et al.

(10) Patent No.: US 8,457,114 B2
(45) Date of Patent: Jun. 4, 2013

(54) METHOD TO OPTIMIZE CALL ESTABLISHMENT IN MOBILE SATELLITE COMMUNICATION SYSTEMS

(75) Inventors: Serdar Sahin, Plano, TX (US); Steven Nguyen, Plano, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 188 days.

(21) Appl. No.: 12/872,474

(22) Filed: Aug. 31, 2010

(65) Prior Publication Data

US 2011/0075655 A1 Mar. 31, 2011

Related U.S. Application Data

(60) Provisional application No. 61/246,212, filed on Sep. 28, 2009, provisional application No. 61/250,631, filed on Oct. 12, 2009.

(51) Int. Cl.
*H04L 12/66* (2006.01)
(52) U.S. Cl.
USPC ........... 370/352; 370/351; 370/353; 370/356; 455/435; 455/433; 455/445
(58) Field of Classification Search
USPC ................ 370/352–356; 455/435.1, 433, 445
See application file for complete search history.

(56) References Cited

U.S. PATENT DOCUMENTS

| 6,088,589 A * | 7/2000 | Valentine et al. ............. 455/433 |
| 6,763,240 B1 * | 7/2004 | Chambers et al. ............. 455/466 |
| 2005/0107087 A1 * | 5/2005 | Makinen et al. ............. 455/450 |
| 2006/0045071 A1 * | 3/2006 | Vimpari et al. ................ 370/352 |
| 2007/0223450 A1 * | 9/2007 | Holmstrom et al. .......... 370/352 |
| 2007/0259661 A1 * | 11/2007 | Hurtta et al. ............... 455/432.1 |
| 2010/0115071 A1 * | 5/2010 | Sanchez Santiso et al. .. 709/222 |
| 2010/0135239 A1 * | 6/2010 | Hurtta et al. .................. 370/329 |
| 2010/0154029 A1 * | 6/2010 | Fernandez Alonso et al. ... 726/1 |
| 2011/0053590 A1 * | 3/2011 | Belling et al. ............. 455/435.1 |
| 2011/0134888 A1 * | 6/2011 | Lin et al. ....................... 370/335 |
| 2012/0059943 A1 * | 3/2012 | Castro Castro et al. ...... 709/227 |

* cited by examiner

*Primary Examiner* — Asad Nawaz
*Assistant Examiner* — Khaled Kassim

(57) ABSTRACT

Call placement to or from satellite UEs is optimized by reducing IMS message exchanges, the originating party has control over QoS parameters; a HPA subscription service is made available, and calls to a terminating satellite UE that is shielded from satellite coverage are completed by selectively employing HPA pages. For a call request without preconditions, an IMS node associated with an originating UE uses the NRSCPA on Offer instead of using the standard terminating node initiated NRSCPA on Answer. An IMS node associated with a terminating UE checks for HPA subscription by the user. If subscribed, the terminating INVITE request is for a "Conversational" or "Interactive" service, and the terminating UE is in PMM_IDLE state, the satellite RAN pages the terminating UE using HPA.

9 Claims, 10 Drawing Sheets

| Message or Event | Delay (ms) |
|---|---|
| Uplink Assignment | 32 |
| ------- INVITE -------> | 533 |
| <--- 183 Session progress --- | 433 |
| ------- PRACK -------> | 225 |
| <----- 200 OK (PRACK) ----- | 266 |
| <....... Secondary PDP Context .......> | 1500 |
| ------- UPDATE -------> | 533 |
| <----- 200 OK (UPDATE) ----- | 391 |
| <----- 180 Ringing ----- | 208 |
| ------- PRACK -------> | 225 |
| <----- 200 OK (PRACK) ----- | 266 |
| <----- 200 OK ----- | 391 |
| Total Delay | 5000 |

RTT (ms)　　　　　　31.5
Link Speed (kbps)　　9.6
PDP Context (ms)　　1500

*FIG. 5*
*(PRIOR ART)*

METHOD TO OPTIMIZE CALL ESTABLISHMENT IN MOBILE SATELLITE COMMUNICATION SYSTEMS

This application claims priority to U.S. Provisional Patent Application Ser. No. 61/246,212, filed Sep. 28, 2009 and U.S. Provisional Patent Application Ser. No. 61/250,631, filed Oct. 12, 2009.

TECHNICAL FIELD

The present invention relates generally to telecommunication systems, and in particular to a satellite RAN and IMS network operative to establish certain calls with reduced latency and selectively using HPA pages to reach satellite UE.

BACKGROUND

The IP Multimedia Subsystem (IMS), as defined by the 3$^{rd}$ Generation Partnership Project (3GPP) standards body, merges telephony and Internet technology by providing an all-IP based architecture for the telecommunications industry. The IMS is based on the Session Initiation Protocol (SIP) and makes heavy use of the protocols defined within the IETF. IMS offers a network of servers and databases that assist a user agent with the task of establishing and managing sessions. IMS uses the term sessions because the connections between users are no longer limited to voice services (a phone call). Sessions may be voice, video, text, or other services connecting two or more user agents together. A representative IMS network is depicted in FIG. 1.

Communications between nodes within an IMS network utilize the Session Initiation Protocol (SIP). SIP is a signaling protocol for Internet conferencing, telephony, presence, events notification, instant messaging, and the like. SIP signaling uses a long-term stable identifier, the SIP Universal Resource Indicator (URI). User equipment (UE) in an IMS refers to a device that contains the SIP User Agent that will initiate or terminate SIP sessions. In particular, one form of UE is a mobile terminal operative to send and receive data across a defined air interface, such as Wideband Code Division Multiple Access (WCDMA).

SIP signaling packets in an IMS network are processed by SIP servers or proxies collectively called Call Session Control Function (CSCF). Different types of CSCFs perform specific functions.

A Proxy-CSCF (P-CSCF) is a SIP proxy that is the first point of contact for an IMS terminal (UE). The P-CSCF may reside in the terminal's H-PLMN or a V-PLMN. In either case, a P-CSCF is assigned to a UE during registration, which does not change for the duration of the registration. All SIP messages to and from the UE pass through the P-CSCF, which can inspect them. The P-CSCF performs authentication and security functions for the UE, and maintains records of communications for billing.

A Serving-CSCF (S-CSCF) is the central SIP proxy in a UE's H-PLMN that performs SIP services and session control. Based on information from a Home Subscriber Server (HSS) database, the S-CSCF handles SIP registrations, in which it binds the UE IP address to a SIP address. The S-CSCF also can intercept and inspect all SIP messages to and from the UE. The S-CSCF decides to which AS SIP messages will be forwarded, to obtain their services. The S-CSCF also provides routing services, typically using Electronic Numbering (ENUM) lookups, and it enforces network operator policies.

An Interrogating-CSCF (I-CSCF) is a SIP proxy located at the edge of an administrative domain. The IP address of the I-CSCF is published in the Domain Name System (DNS) of the domain, so that remote servers can find it, and use it as a forwarding point for SIP packets into the I-CSCF's domain. The I-CSCF retrieves the subscriber location from the HSS, and then routes SIP requests to its assigned S-CSCF.

An IMS network includes a Home Subscriber Server (HSS) that stores the relevant user data including authentication information and service data. As part of the user profile, initial Filter Criteria (iFC) are defined to indicate which application servers are to be invoked based on information in the signaling plane.

An IMS network also includes one or more Application Servers (AS) providing various services, such as audio and video broadcast or streaming, push-to-talk, videoconferencing, games, file sharing, e-mail, and the like. Application Servers are invoked based on the iFCs that are stored in the user profile. The S-CSCF will pass signaling onto an AS if the criteria defined in the iFC are met. Once invoked, the AS can take part in the session and provide additional capabilities.

FIG. 1 is a simplified functional block diagram of an IMS network 10. A UE 12 has associated with it one or more CSCFs (e.g., a P-CSCF, S-CSCF, and/or I-CSCF) 14. The CSCF 14 is connected to various AS 16, 18 providing services. A HSS 20 provides information for Authentication, Authorization and Accounting (AAA) functions.

The Diameter protocol is an advanced, extensible AAA protocol, derived from the industry standard RADIUS (Remote Authentication Dial-In User Service) protocol. Diameter includes numerous enhancements to RADIUS, such as error handling and message delivery reliability. It extracts the essence of the AAA protocol from RADIUS and defines a set of messages that are general enough to form the core of a Diameter base protocol. The various applications that require AAA functions can define their own extensions on top of the Diameter base protocol, and can benefit from the general capabilities provided by the Diameter base protocol.

FIG. 2 depicts a representative prior art call flow for a UE to UE call, in which preconditions are used to avoid a problem known as "ghost ringing." This is accomplished by ensuring that radio resources are reserved on the calling party's side (UE #1) before alerting the called party (UE #2) The call flow with preconditions of FIG. 2 is extracted from section 5.1.2.3 of 3GPP TR 24.930 V.7.5.0, the disclosure of which is incorporated herein by reference in its entirety.

When the called and calling UEs are mobile satellite terminals, the call flow of FIG. 2 presents several problems. First, if the called UE is located where there is no satellite coverage, such as inside a building, the SIP INVITE message at step 207 will never reach the UE unless the satellite initiates a High Penetration Alert (HPA) page. A HPA page is a paging message transmitted at much higher power than a normal page. The HPA page directs the UE to display a message asking the called party to exit the building (or otherwise move into an area of satellite coverage) to receive the call. One solution is for the satellite Radio Access Network (RAN) to send a HPA page on every SIP INVITE, regardless of session establishment type (e.g. voice calls, messaging). However, this approach severely impacts radio resources.

Additionally, the codec negotiation of steps 217 to 232 result from Network Requested Secondary PDP Context Activation (NRSCPA) on Answer—that is, no PDP context is established until the called party is reached via initial SIP signaling. While NRSCPA on Answer has some advantages in terrestrial networks, such as ensuring that network resources are available and reserved prior to connecting the call, it entails extensive SIP messaging between the two UEs. When a call is established over a satellite, the voluminous exchange of SIP messages not only consumes satellite link bandwidth, it also increases the call setup time.

SUMMARY

According to one or more embodiments of the present invention described and claimed herein, call placement to or from satellite UEs is optimized by reducing IMS message exchanges, the originating party has control over QoS parameters, a HPA subscription service is made available, and calls to a terminating satellite UE that is shielded from satellite coverage are completed by selectively employing HPA pages. For a call request without preconditions, an IMS node associated with an originating UE uses the NRSCPA on Offer instead of using the standard NRSCPA on Answer. An IMS node associated with a terminating UE checks for HPA subscription by the user. If subscribed, the terminating INVITE request is for a "Conversational" or "Interactive" service, and the terminating UE is in PMM_IDLE state, the satellite RAN pages the terminating UE using HPA.

One embodiment relates to a method of establishing a telecommunication session with a mobile satellite terminal having an IMS client. An IMS PDP context activation is established by a P-CSCF associated with the calling UE prior to exchanging any SIP signaling with a proxy associated with the called UE. A HPA is directed to the called UE only if the called UE subscribes to a HPA service, and only for calls having a conversational or interactive traffic class.

Another embodiment relates to an IMS network node operative to receive a SIP INVITE message from an originating UE and, in response to the contents of the SIP INVITE message, establish an IMS PDP context activation prior to exchanging any SIP signaling with a proxy associated with a terminating UE.

Yet another embodiment relates to an IMS network node operative to receive a SIP INVITE message from another IMS node and, in response to the contents of the SIP INVITE message and further in response to a called party identified in the SIP INVITE message subscribing to a HPA paging service, page a UE associated with the called party using a HPA page.

BRIEF DESCRIPTION OF THE DRAWINGS

FIG. 5 is a table of call setup latencies in prior art call setup techniques.

DETAILED DESCRIPTION

Figure 3:
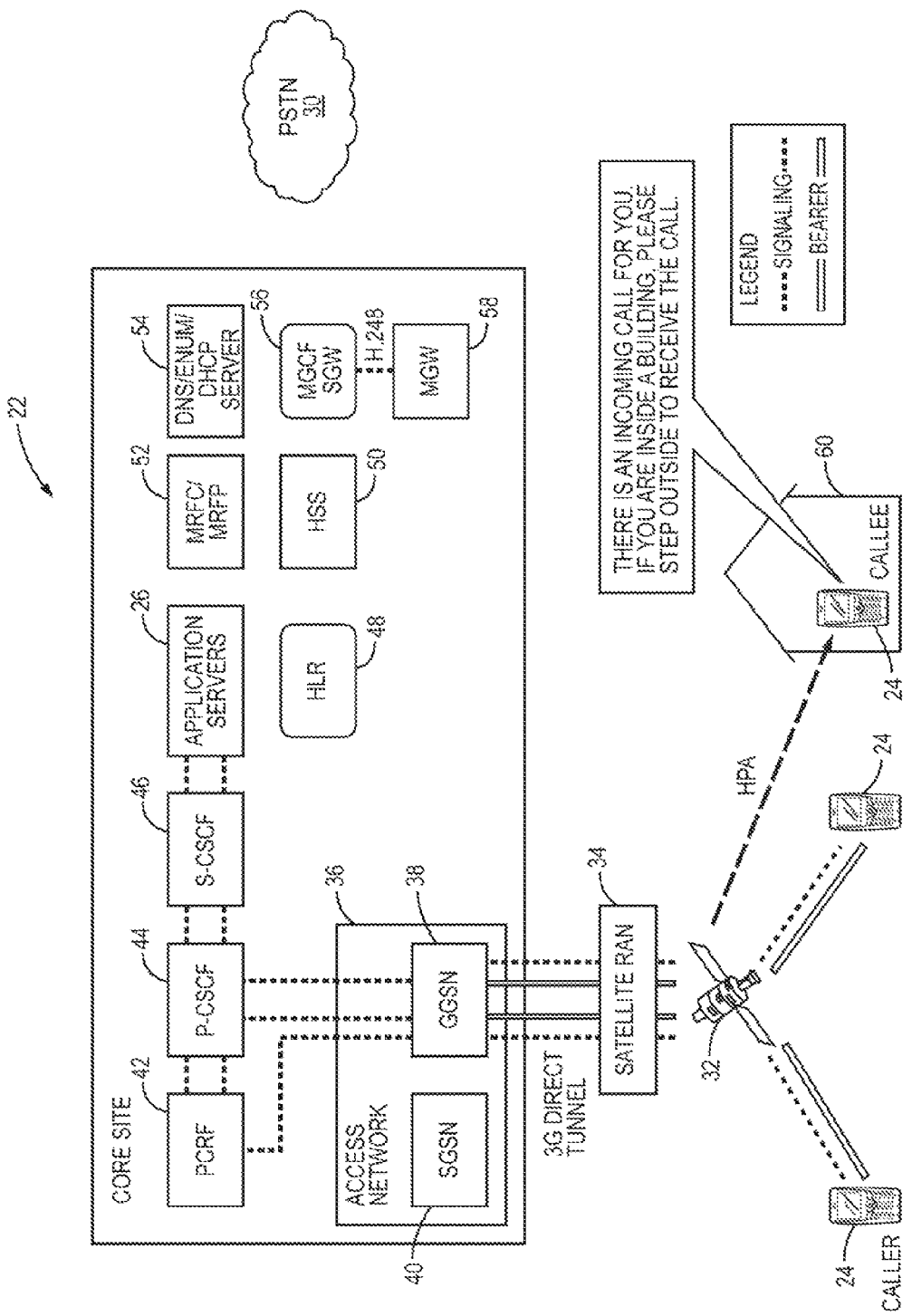
FIG. 3 is a functional block diagram of a satellite RAN integrated with an IMS network.
Figure 4A:
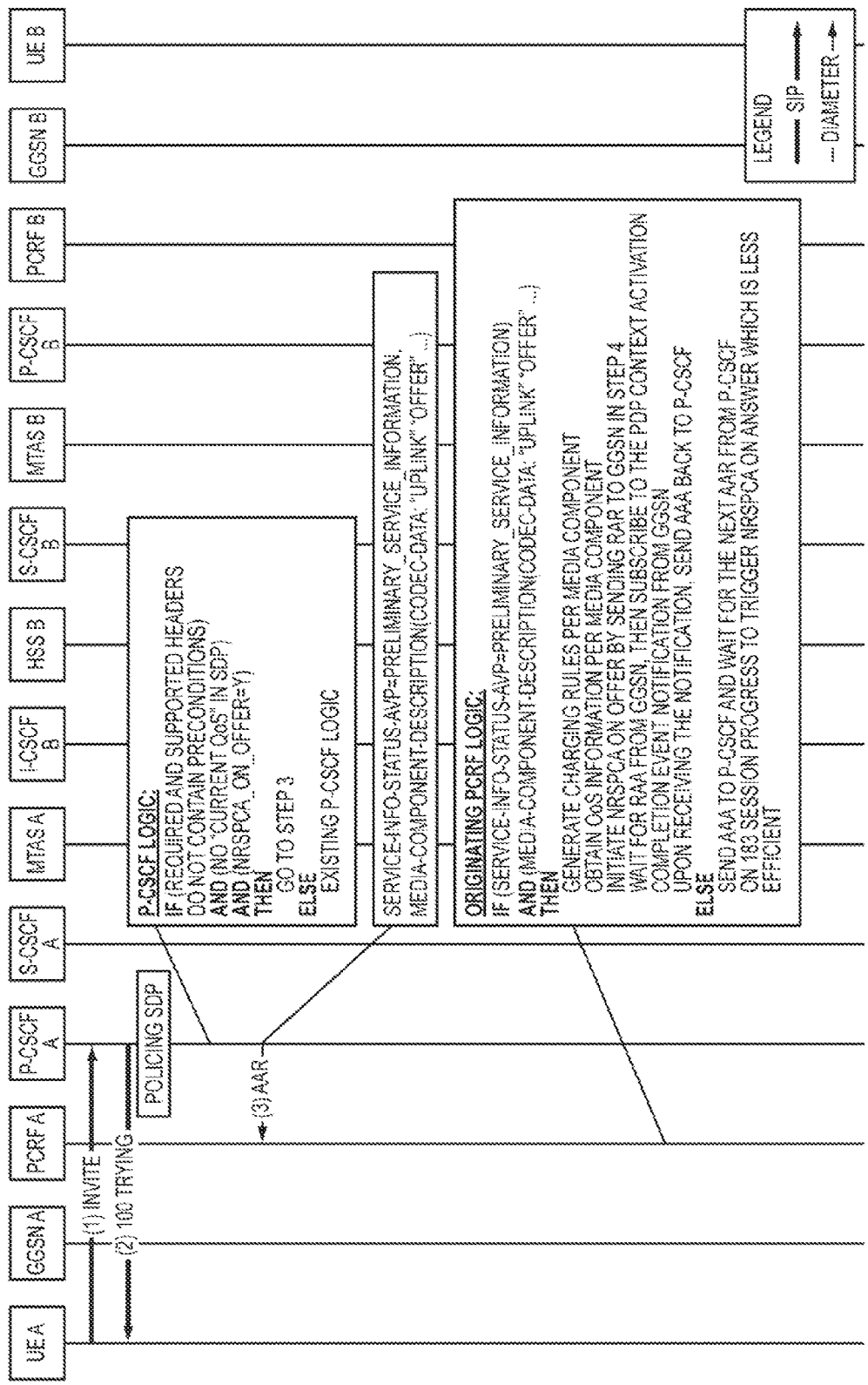
FIGS. 4A-4F depict a call flow diagram of a satellite call setup according to one embodiment of the present invention.
Figure 4B:
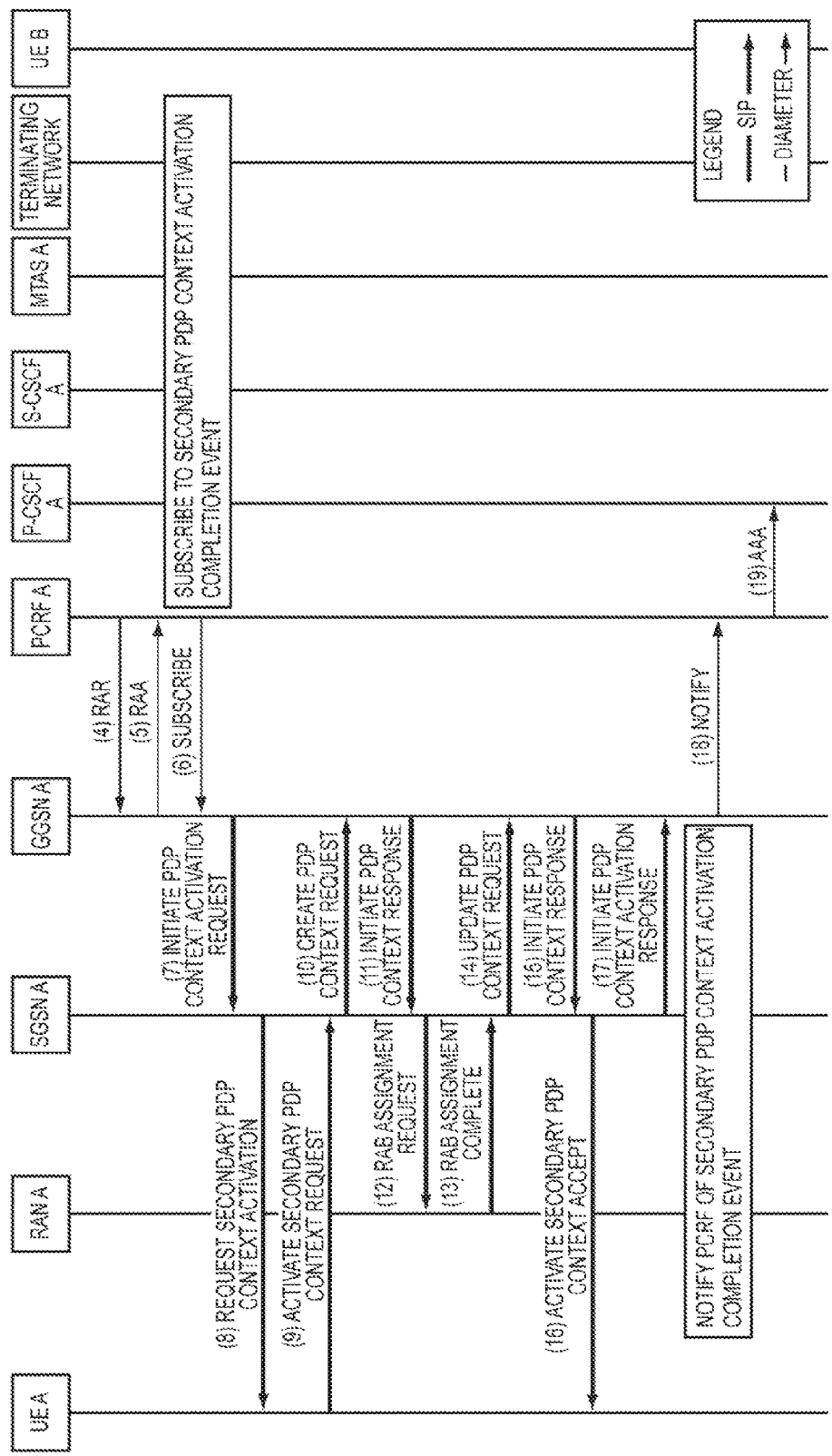
Figure 4C:
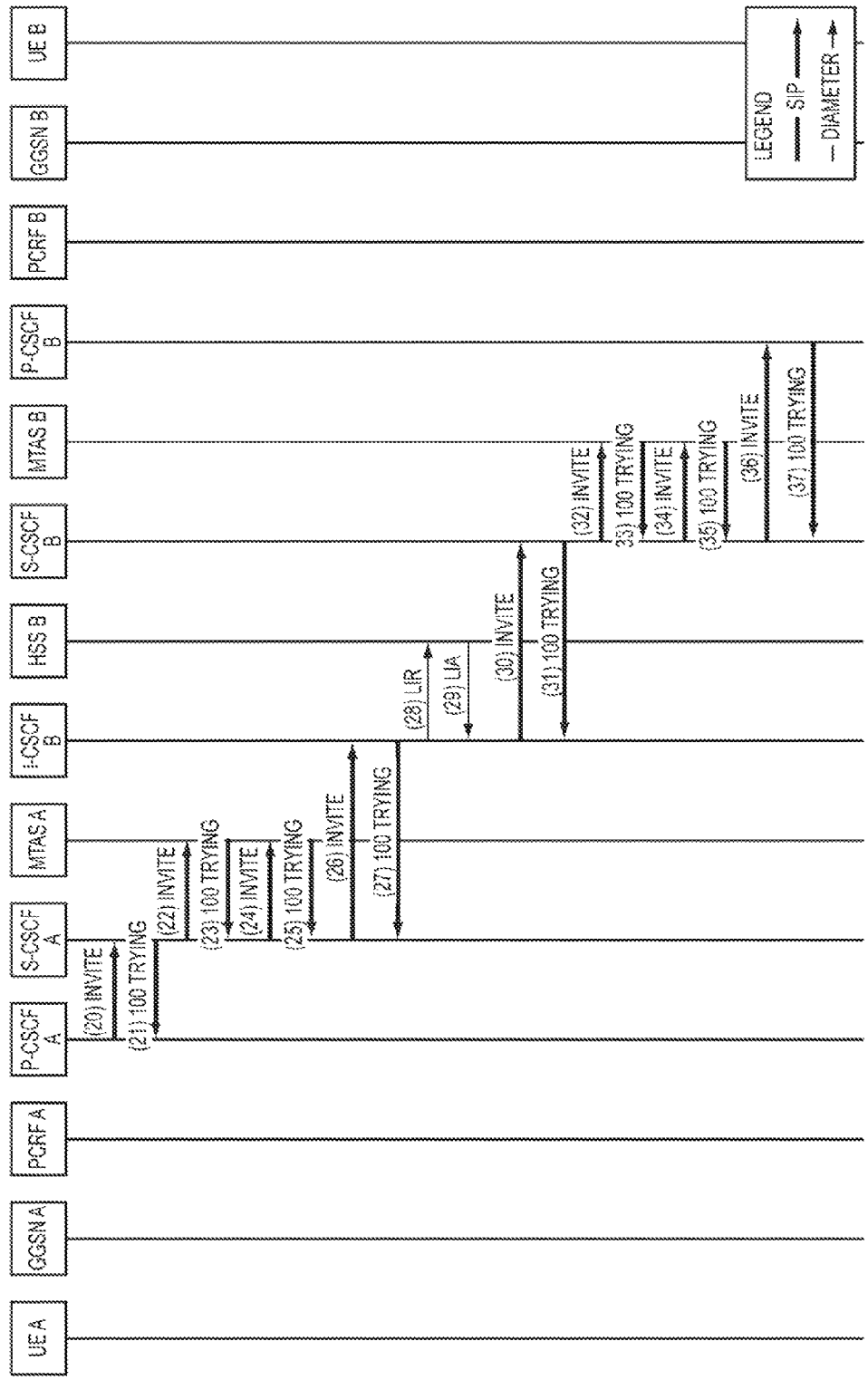
Figure 4D:
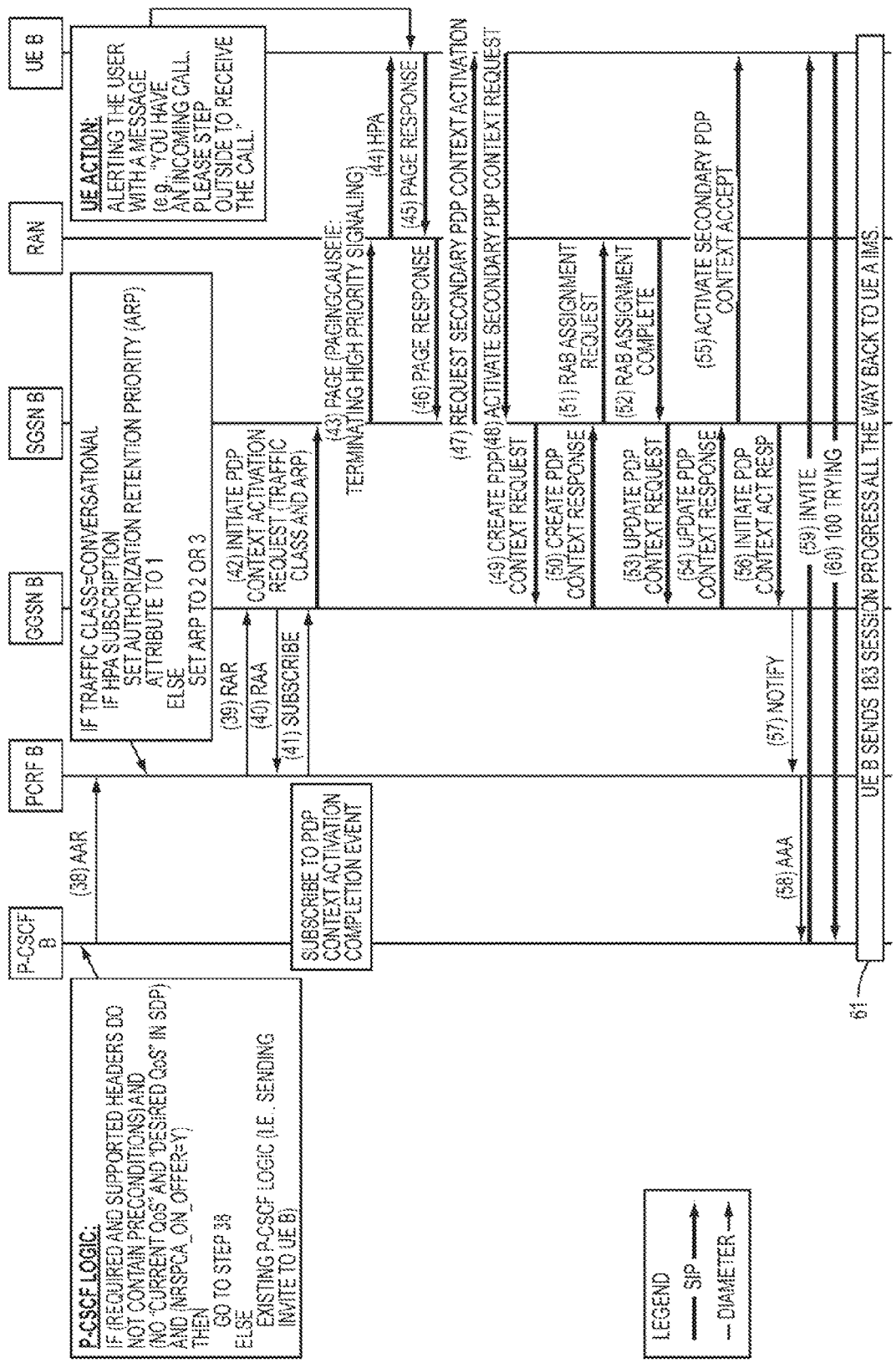
Figure 4E:
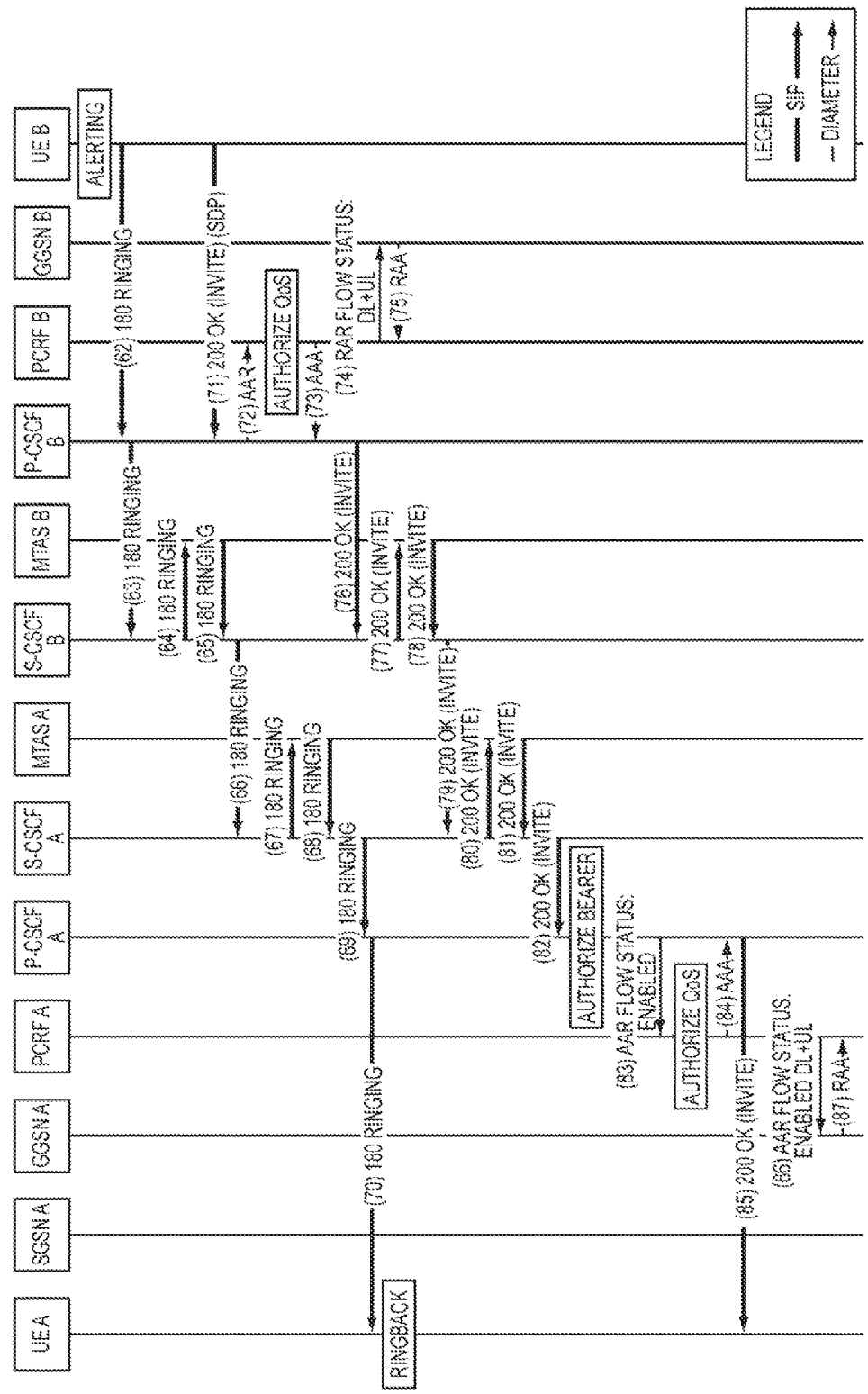
Figure 4F:
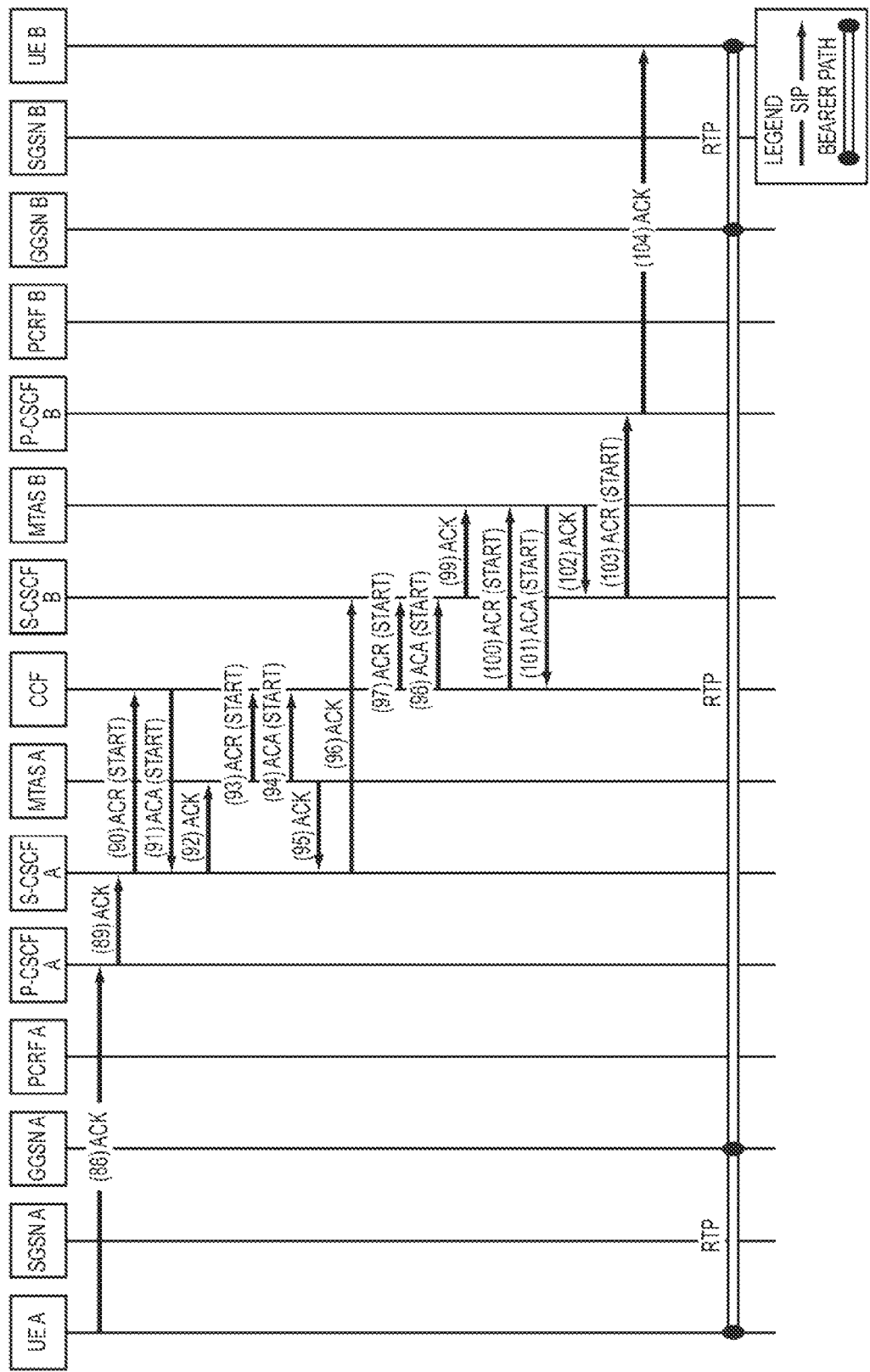

FIG. 3 depicts an integrated satellite/IMS network 22. The network 22 connects satellite mobile terminals 24 with each other, with application servers 26 or other resources in an IMS network, or with communication terminals in other networks; such as the Public Switched Telephone Network (PSTN) 30. Traffic to and from the Mobile terminals 24 is transmitted by one or more satellites 32, with access controlled by a satellite Radio Access Network (RAN) 34. The satellite RAN 34 is communicatively coupled to a terrestrial wireless IP Connectivity Access Network (IP-CAN) 36. In the embodiment depicted in FIG. 3, the wireless IP-CAN 36 is a Wideband Code Division Multiple Access (WCDMA) network with General Packet Radio Service (GPRS) comprising at least a Gateway GPRS Service Node (GGSN) 38 and a Serving GPRS Support Node (SGSN) 40. The WCDMA IP-CAN 36 is connected to an IMS core network comprising a Policy and Charging Rule Function (PCRF) 42, a P-CSCF 44, a S-CSCF 46, and application servers 26.

The IMS network additionally comprises a Home Location Register (HLR) 48 and HSS 50, a Media Resource Function 52 comprising a Media Resource Function Controller (MRFC) and a Media Resource Function Processor (MRFP), and a server 54 performing address lookup and translation functions such as DNS, Electronic Numbering (ENUM), and Dynamic Host Configuration Protocol (DHCP). The IMS network further includes a Media Gateway Controller Function (MGCF) and Signaling Gateway (SGW) 56 connected to a Media Gateway (MGW) 58 across a H.248 interface. The structure and operation of the IMS network is well defined, and is not further explained herein. Those of skill in the art will further recognize the existence of a packet core, comprising switches and routers (not shown), that carries bearer traffic between the GGSN 38 and MGW 58.

FIG. 3 depicts a voice or interactive call directed to a satellite mobile UE located in a building 60. A High Penetration Alert (HPA) page is selectively employed to reach the called UE 24. The HPA displays a message, such as that depicted, that the user has an incoming call, and requesting the user to exit the building 60 to receive the call from the satellite 32. According to embodiments described and claimed herein, the HPA is selectively employed based on the type of call, the state of the called UE 24, and whether the called user subscribes to a HPA service.

The operation of embodiments of the present invention is described in the context of a voice call from one satellite UE 24 (identified as user "A") to another satellite UE 24 (identified as user "B"), when user B is in a building. Both the originating mobile satellite UE 24 and the terminating mobile satellite UE 24 typically include a special codec to optimize the transmission of voice packet over the satellite link. In this case, the standard IMS call flow with preconditions can be enhanced to: give the originating mobile satellite UE 24 full control in providing Quality of Service (QoS) for various end user services; increase successful call establishment rate without wasting satellite radio resources by using HPA paging only for selected bearer services (e.g., only voice and interactive calls); and charge mobile satellite subscribers for subscribing to HPA as a service.

First, the originating mobile satellite UE 24 uses the Network Requested Secondary PDP Context Activation (NR-SCPA) on Offer instead of using the standard terminating-UE 24 initiated Secondary PDP Context Activation procedure (NRSCPA on Answer). This method eliminates preconditions and reduces the number of messaging exchanges between the originating mobile UE 24 and the terminating mobile UE 24 in half (i.e., no PRACK, UPDATE, and corresponding 200OKs). In addition, NRSCPA on Offer gives the operator full control in providing QoS for various end user services as the network instructs the UE 24 which QoS parameter values to use, thus avoiding pre-provisioning of terminals.

Second, the terminating PCRF 42 checks for HPA subscription before initiating NRSPCA which triggers HPA, thus allowing mobile satellite operators to charge subscribers for using HPA.

Third, the satellite RAN 34 sends HPA to the terminating UE 24 only when the terminating INVITE request is for a "Conversational" or "Interactive" (e.g., a voice call or a push-to-talk request), thus optimizing page channel resource usage.

The service logic in the IMS nodes P-CSCF 44, PCRF 42, GGSN 38, SGSN 40, and the satellite RAN 34 required to support NRSPCA on Offer is described below, for both the originating and terminating sides. For the purpose of explanation, both the originating mobile UE 24 (user "A") and terminating mobile UE 24 "B" (user "B") are considered as mobile satellite subscribers as the most general case. However, in general, either of them could be a PSTN or PLMN subscriber and the logic for the other subscriber remains unchanged.

Originating Side Service Logic

Mobile satellite subscriber A is making a voice call to mobile satellite subscriber B. Upon receiving the originating SIP INVITE message (FIG. 4, step 1), subscriber A's P-CSCF 44 executes the following logic. If the Require header field and the Supported header field in the INVITE message do not contain preconditions, the SDP portion of the INVITE message does not contain "desired QoS" and "current QoS," and a configurable system parameter, such as NRSPCA_ON_OFFER is set to "Y" in A's P-CSCF 44, then the following steps occur:

A's P-CSCF 44 requests that A's PCRF 42 perform preliminary QoS authorization for an incoming voice call by sending a Diameter AAR (Authorize and Authenticate Request) message (SERVICE_INFO_STATUS: PRELIMINARY_SERVICE_INFORMATION, Media-Component-Description: Code-Data: "uplink" "offer" . . . ) to PCRF 42 (FIG. 4, step 3). Alternatively, the AAR can include a new Attribute-Value. Pair (AVP) such as NRSPCA_ON_OFFER to indicate to PCRF 42 that this is a call which requires NRSPCA on Offer. Therefore, PCRF 42 will delay sending AAA back to P-CSCF 44 (FIG. 4, step 19) until PCRF 42 receives an indication of successful secondary PDP context activation from GGSN 38 (FIG. 4, step 18).

A's PCRF 42 requests that A's GGSN 38 perform NRSPCA for a voice call by sending a Diameter RAR (Re-Auth-Request) message to GGSN 38 (FIG. 4, step 4).

A's GGSN 38 requests that A's SGSN 40 create a secondary PDP context for a voice call (FIG. 4, step 7).

A's SGSN 40 sends Request PDP Context Activation message to A (FIG. 4, step 7).

A's GGSN 38, A's SGSN 40, and UE A 24 together complete the NRSPCA procedure; as depicted in FIG. 4, steps 9-17. A's GGSN 38 then notifies A's PCRF 42 of the successful secondary PDP context activation (FIG. 4, step 18), which sends an AAA to A's P-CSCF 44 (FIG. 4, step 19).

Note that, as an alternative to A's PCRF 42 sending a AAA to A's P-CSCF 44 at step 19—that is, at the completion of secondary PDP context activation—A's PCRF 42 could send the AAA immediately upon receipt of AAR at step 3. A's PCRF 42 would send RAR to A's GGSN 38, and receive a RAA in response, as depicted at FIG. 4, steps 4-5. Then, after successful secondary PDP context establishment, following FIG. 4, step 17, A's GGSN 38 would send a CCR (Update) to A's PCRF 42, which would respond with CCA. A's PCRF 42 would then send RAR to A's P-CSCF 44, to notify the P-CSCF 44 that the resource reservation procedure is complete.

In any event, following the completion of the NRSPCA procedure and notifications thereof, A's P-CSCF 44 sends an INVITE to B's I-CSCF (FIG. 4, steps 20-27), which interacts with HSS and B's S-CSCF to route the call to B's P-CSCF (FIG. 4, steps 28-37).

Figure 1:
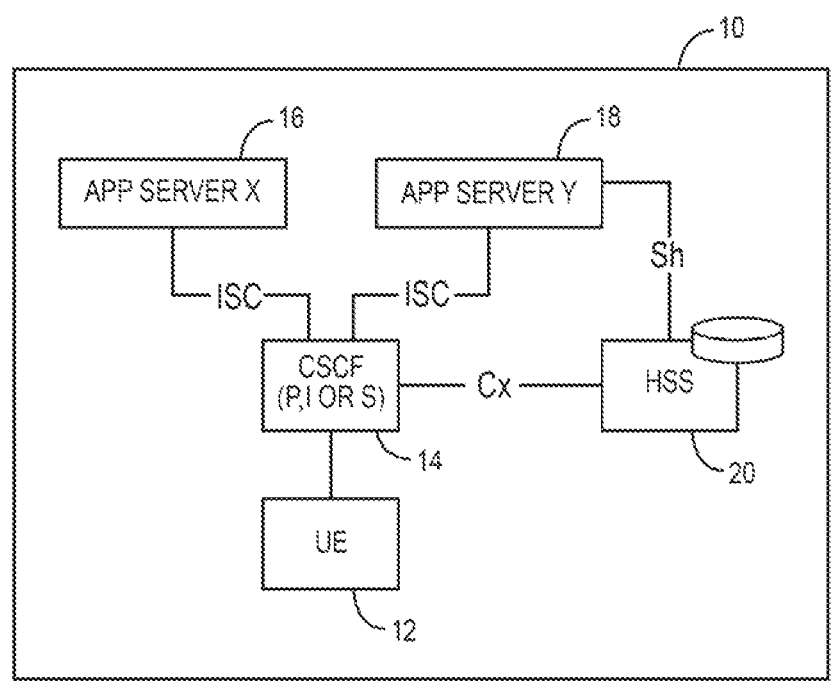
FIG. 1 is a functional block diagram of a conventional IMS network.
Figure 2:
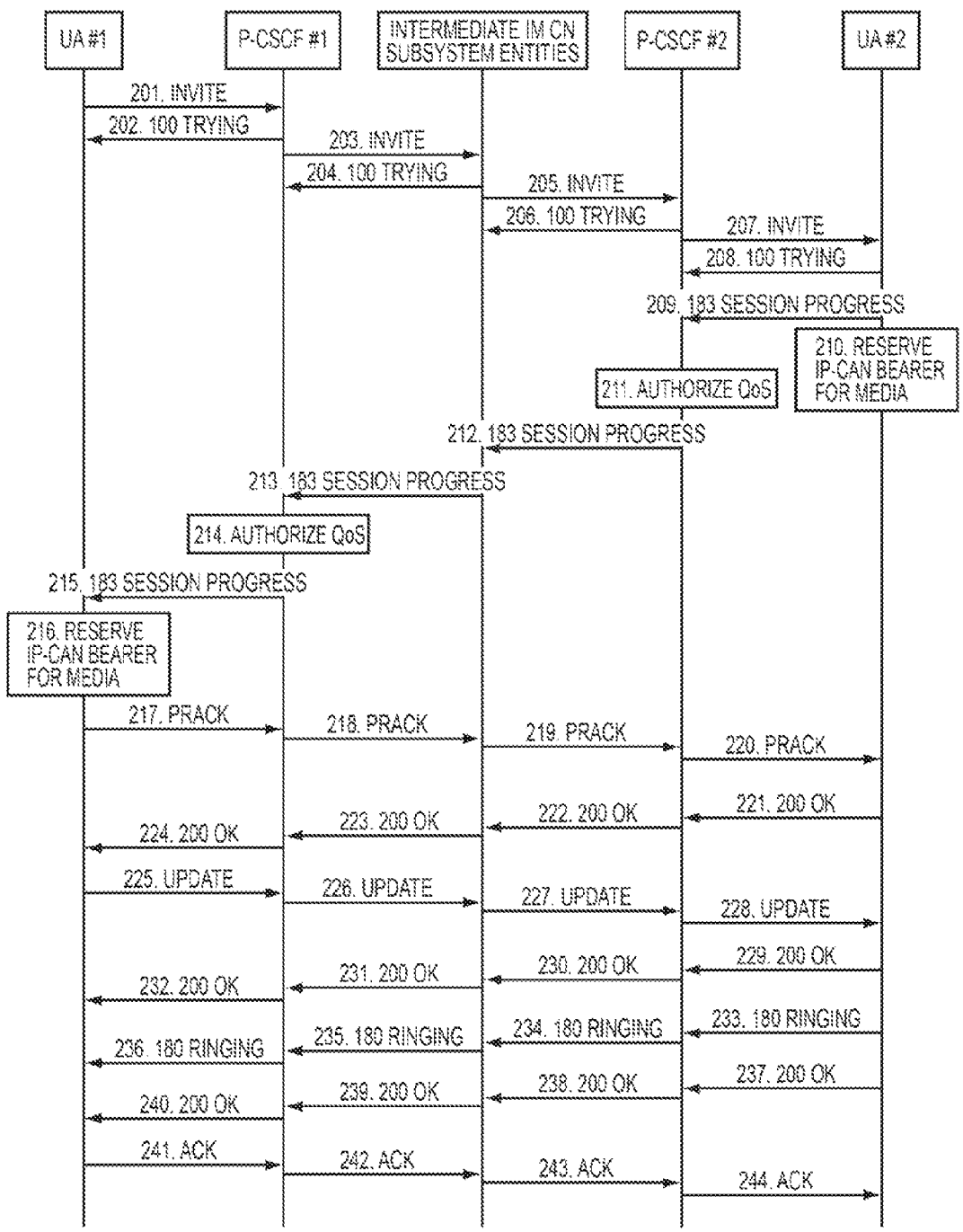
FIG. 2 is a call flow diagram of conventional call setup in an IMS network.

If the NRSPCA_ON_OFFER parameter is not set, or if the INVITE message includes preconditions, then the conventional originating P-CSCF 44 service logic applies, as depicted in FIG. 2. That is, A's P-CSCF 44 sends a SIP INVITE message to the terminating P-CSCF 44 via the IMS core (FIG. 2, steps 203-206) and initiates the QoS authorization procedure (FIG. 2, step 214) upon receiving a 183 Session Progress from the called UE 24 (FIG. 2, steps 212-213).

Terminating Side Service Logic

When B's P-CSCF 44 receives the terminating INVITE message (FIG. 4, step 36), B's P-CSCF 44 executes the following service logic. If the Require header and the Supported header in the SIP INVITE message do not contain preconditions, the SDP portion of the INVITE does not contain "desired QoS" and "current QoS", and a configurable system parameter such as NRSPCA_ON_OFFER is set to "Y" in B's P-CSCF 44, then the following steps occur:

B's P-CSCF 44 requests that B's PCRF 42 perform preliminary QoS authorization for an incoming voice call by sending a Diameter AAR message to B's PCRF 42, the AAR message including a new AVP named NRSPCA_ON_OFFER (FIG. 4, step 38).

B's PCRF 42 checks for B's HPA subscription.

If B has an HPA subscription, B's PCRF 42 requests that B's GGSN 38 perform NRSPCA with HPA for an incoming voice call by sending a Diameter RAR message (Traffic Class: Conversational, Allocation Retention Priority (ARP): 1) to GGSN 38 (FIG. 4, step 39). Note that ARP value selections are arbitrary for HPA and non-HPA calls. The requirement is that the chosen ARP for HPA must be unique.

If, on the other hand, B does not have an HPA subscription, B's PCRF 42 requests that B's GGSN 38 perform NRSPCA for an incoming voice call without HPA by sending a Diameter RAR message (Traffic Class: Conversational, Allocation Retention Priority: 2 or 3) to GGSN 38 (FIG. 4, step 39). B will receive the INVITE message if B is not inside a building.

B's GGSN 38 requests that B's SGSN 40 create a secondary PDP context for a terminating voice call by sending an Initiate PDP Context Activation Request message to B's SGSN 40 (FIG. 4, step 42).

If B is inside a building (or otherwise out of satellite coverage), B's UE 24 Packet Mobility Management (PMM) state should be PMM_IDLE. Therefore, B's SGSN 38 sends a Page message (Cause IE: "Terminating High Priority Signaling") to the satellite RAN 34 (FIG. 4, step 43).

In response to the Paging Cause Information Element (IE) being set to "Terminating High Priority Signaling," the RAN 34 sends an HPA page to B's UE 24 (FIG. 4, step 44).

B's UE 24 displays a message to the effect that "There is an incoming voice call for you. If you are inside a building, please step outside the building to answer it."

User B steps outside the building to receive the SIP INVITE message, and send Page Response (FIG. 4, steps 45-46).

B's GGSN 38, B's SGSN 40, and B's UE 24 together complete the NRSPCA procedure (FIG. 4, steps 47-58).

Note that, as an alternative to B's PCRF 42 sending a AAA to B's P-CSCF 44 at step 58—that is, at the completion of secondary PDP context activation, B's PCRF 42 could send the AAA immediately upon receipt of AAR at step 38. Then, after successful secondary PDP context establishment, B's PCRF 42 would send RAR to B's P-CSCF 44 (e.g., at FIG. 4, step 57) to notify B's P-CSCF 44 of the event.

B's P-CSCF 44 sends INVITE to B's UE 24 (FIG. 4, step 59).

B's UE 24 sends 100 Trying (FIG. 4, step 60), and will then send a 183 Session Progress response all the back to UE A via IMS (indicated generally at FIG. 4, step 61). B's UE 24 then sends 180 Ringing (FIG. 4, step 62), and 200 OK (INVITE) with SDP (FIG. 4, step 71).

B's PCRF 42 performs final QoS authorization (FIG. 4, steps 72-75).

B's P-CSCF 44 relays the 200 OK (INVITE) to A's P-CSCF 44 (FIG. 4, steps 76-82), which requests that A's PCRF 42 perform final QoS authorization (FIG. 4, steps 83-87).

The call is then established between A's UE 24 and B's UE 24, as depicted in the remaining steps of FIG. 4.

If the NRSPCA_ON_OFFER parameter is not set in B's P-CSCF 44, or if the received SIP INVITE message includes preconditions, then the conventional terminating P-CSCF 44 service logic applies, as depicted in FIG. 2. That is, B's P-CSCF 44 sends a SIP INVITE message to the terminating UE 24 (FIG. 2, steps 207) and initiates the QoS authorization procedure (FIG. 2, step 211) upon receiving a 183 Session Progress from the called UE 24 (FIG. 2, step 183).

The following table shows an example of the mapping between Traffic Class and Allocation Retention Priority (ARP) to Paging Cause Information Element (IE) in the SGSN 40.

| Case | | | Paging Cause IE | RAN Action |
|---|---|---|---|---|
| NRSPCA/ Downlink Payload | Traffic Class is Conversational | ARP is 1 | Terminating High Priority Signaling | HPA |
| | | ARP is 2 | Terminating Conversational Call | Normal Page |
| | | ARP is 3 | Terminating Conversational Call | Normal Page |
| | Traffic Class is Streaming | N/A | Terminating Streaming Call | Normal page |
| | Traffic Class is Interactive | ARP is 1 | Terminating High Priority Signaling | HPA |
| | Traffic Class is Interactive | ARP is 2 | Terminating Interactive Call | Normal Page |
| | Traffic Class is Interactive | ARP is 3 | Terminating Interactive Call | Normal Page |
| | Traffic Class is Background | N/A | Terminating Background Call | Normal Page |
| Downlink Signaling | HLR or SGSN Initiated Detach | N/A | Terminating Low Priority Signaling | Normal Page |
| | GGSN or SGSN Initiated PDP Context Deactivation | N/A | Terminating Low Priority Signaling | Normal Page |
| | GGSN Initiated PDP Context Modification | N/A | Terminating Low Priority Signaling | Normal Page |
| | MT-SMS | N/A | Terminating Low Priority Signaling | Normal Page |

Note that in this example HPA is only activated when the ARP is 1, and the Traffic Class is Conversational or Interactive.

According to embodiments of the present invention, satellite radio resources usage is optimized and successful call establishment rate is increased by using Network Request Secondary PDP Context Activation on Offer and HPA to set up mobile satellite UE 24 to mobile satellite UE 24 or PSTN/PLMN to mobile satellite UE 24 call. Furthermore, the number of SIP message exchanges required to set up a mobile satellite UE 24 to mobile satellite UE 24 calls over IMS is significantly reduced, resulting in both decreased traffic over the satellite RAN 34, and decreased latency in call establishment. FIG. 5 depicts the processing time for a standard Mobile to PSTN call without NRSPCA on Offer, requiring 5 seconds delay. By using NRSCPA on Offer, the call setup time can be reduced by a minimum of 2 seconds. For a mobile UE 24 to mobile UE 24 call, the setup time saving will be even greater due to elimination of PRACK/200OK and UPDATE/200OK SIP message exchanges over the radio link to the terminating mobile UE 24.

Additionally, embodiments of the present invention give the operator full control in providing QoS for various end user services, thus avoiding QoS configuration in a variety of terminals from different vendors. Additionally, a method is provided for mobile satellite service providers to charge subscribers for subscribing to HPA.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of establishing a telecommunication session with a mobile satellite terminal having an IP Multimedia System (IMS) client, comprising:
    establishing an IMS Packet Data Protocol (PDP) context activation by a Proxy Call Session Control Function (P-CSCF) associated with the calling User Equipment (UE) prior to exchanging any Session Initiation Protocol (SIP) signaling with a proxy associated with the called UE, wherein the establishing the IMS PDP context activation comprises initiating a Network Requested Secondary PDP Context Activation (NRSPCA) on Offer by sending a Packet Data Protocol (PDP) context activation request to a Gateway GPRS Service node (GGSN) associated with the calling UE and withholding an acknowledgement to the P-CSCF until receiving an indication of a successful activation from the GGSN; and
    using a High Penetration Alert (HPA) directed to the called UE only if the called UE subscribes to a HPA service, and only for calls having a conversational or interactive traffic class.

2. The method of claim 1 wherein initiating a NRSPCA on Offer comprises the P-CSCF associated with the calling UE requesting a NRSPCA on Offer from a Policy and Charging Rule Function (PCRF) associated with the calling UE.

3. The method of claim 2 wherein requesting a NRSPCA on Offer from the PCRF comprises the P-CSCF sending the PCRF an Authorize and Authenticate Request (AAR).

4. The method of claim 2 wherein requesting a NRSPCA on Offer from the PCRF comprises the P-CSCF sending the PCRF an Attribute-Value Pair (AVP) indicating NRSPCA on Offer.

5. The method of claim 1 wherein the PCRF sending a PDP context activation request to the GGSN comprises sending a Diameter Re-Auth-Request (RAR) message to the GGSN.

6. The method of claim 1 wherein initiating a NRSCPA on Offer further comprises the GGSN sending a PDP context activation request to a Serving GPRS Support Node (SGSN) associated with the calling UE.

7. The method of claim 6 wherein initiating a NRSPCA on Offer further comprises
- the GGSN sending a PDP context activation request to the calling UE; and
- the GGSN, SGSN, and calling UE cooperatively creating the PDP context activation.

8. The method of claim 1 wherein using a HPA only for calls having a conversational or interactive traffic class comprises using HPA for conversational or interactive traffic classes for which a unique Allocation Retention Priority (ARP) is chosen.

9. The method of claim 1 wherein using a HPA directed to the called UE comprises
- receiving an SIP INVITE message by a P-SCSF associated with the called UE;
- the P-SCSF associated with the called UE requesting a preliminary Quality of Service (QoS) authorization from a Policy and Charging Rule Function (PCRF) associated with the called UE; and
- if the called UE has a HPA subscription, the PCRF associated with the called UE requesting a Gateway GPRS Service Node (GGSN) associated with the calling UE to perform a Network Requested Secondary PDP Context Activation (NRSPCA) with HPA.

* * * * *